(12) United States Patent
Angstmann et al.

(10) Patent No.: US 11,339,624 B2
(45) Date of Patent: May 24, 2022

(54) ROTARY DRIVE ACTUATOR FOR AN ANNULAR WELLBORE PRESSURE CONTROL DEVICE

(71) Applicant: Kinetic Pressure Control, Ltd., Houston, TX (US)

(72) Inventors: Steven A. Angstmann, Houston, TX (US); Bobby J. Gallagher, Houston, TX (US)

(73) Assignee: Kinetic Pressure Control Ltd., Houston, TX (US)

( * ) Notice: Subject to any disclaimer, the term of this patent is extended or adjusted under 35 U.S.C. 154(b) by 458 days.

(21) Appl. No.: 16/678,184

(22) Filed: Nov. 8, 2019

(65) Prior Publication Data

US 2020/0072012 A1    Mar. 5, 2020

Related U.S. Application Data

(63) Continuation of application No. PCT/US2018/032855, filed on May 16, 2018.

(60) Provisional application No. 62/507,334, filed on May 17, 2017.

(51) Int. Cl.
| | |
|---|---|
| *E21B 33/06* | (2006.01) |
| *E21B 34/06* | (2006.01) |
| *E21B 43/12* | (2006.01) |
| *H02K 5/132* | (2006.01) |
| *H02K 7/06* | (2006.01) |

(52) U.S. Cl.
CPC ............. *E21B 33/06* (2013.01); *E21B 34/06* (2013.01); *E21B 43/12* (2013.01); *H02K 5/132* (2013.01); *H02K 7/06* (2013.01)

(58) Field of Classification Search
CPC .......... E21B 33/06; E21B 34/06; E21B 43/12; H02K 5/132; H02K 7/06
See application file for complete search history.

(56) References Cited

U.S. PATENT DOCUMENTS

| | | | |
|---|---|---|---|
| 4,554,496 A | 11/1985 | Rudich, Jr. et al. | |
| 6,461,414 B1* | 10/2002 | Kohl | G01N 33/2823 95/1 |
| 2005/0242308 A1 | 11/2005 | Gaydos | |
| 2006/0108884 A1* | 5/2006 | Shiino | B60T 8/267 310/68 B |
| 2006/0249290 A1 | 11/2006 | Bartlett | |
| 2008/0048140 A1 | 2/2008 | Whitby et al. | |
| 2010/0243261 A1 | 9/2010 | Fern et al. | |
| 2012/0199762 A1 | 8/2012 | Schaefer | |
| 2014/0354096 A1 | 12/2014 | Eriksen | |

(Continued)

OTHER PUBLICATIONS

Extended European Search Report, European Patent Application No. 18801476.5, dated Dec. 16, 2020.

(Continued)

*Primary Examiner* — Aaron L Lembo
(74) *Attorney, Agent, or Firm* — Victor H. Seguta

(57) ABSTRACT

A rotary drive actuator for an annular well pressure control device includes a piston having a tapered inner surface, a through bore and a threaded outer surface. A threaded sleeve having a threaded inner surface is in threaded engagement with the threaded outer surface of the piston. A rotary motor is arranged to rotate the threaded sleeve, whereby rotation of the rotary motor causes corresponding axial motion of the piston.

7 Claims, 3 Drawing Sheets

(56) References Cited

U.S. PATENT DOCUMENTS

2019/0203555 A1\* 7/2019 Gallagher ............. E21B 33/063
2021/0189826 A1\* 6/2021 Gallagher ............... E21B 33/06

OTHER PUBLICATIONS

Search Report and Written Opinion, International Application No. PCT/US2018/032855 dated Aug. 31, 2018.

\* cited by examiner

ROTARY DRIVE ACTUATOR FOR AN ANNULAR WELLBORE PRESSURE CONTROL DEVICE

CROSS REFERENCE TO RELATED APPLICATIONS

Continuation of International Application No. PCT/US18/032855 filed on May 16, 2018. Priority is claimed from U.S. Provisional Application No. 62/507,334 filed May 17, 2017. Both the foregoing applications are incorporated herein by reference in their entirety.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

BACKGROUND

This disclosure relates to the field of wellbore pressure control devices used in wellbore construction and well intervention operations. More specifically, the disclosure relates to annular well pressure control devices which may be selectively actuated to close an annular space between a wellbore tubular and a conduit inserted through the pressure control device.

An annular wellbore pressure control device (e.g., an annular blowout preventer or annular BOP) is a device used to seal either an open wellbore or an annular space around a tubular or conduit disposed in the wellbore to contain wellbore pressure. Annular BOPs known in the art use hydraulic pressure to actuate (e.g., by inflation) a seal element that when actuated closes the annular space. The use of hydraulic pressure to actuate the seal element has several drawbacks including the requirement for a large amount of support equipment to power the device such as hydraulic power units and accumulator banks. There are significant cost associated with high pressure piping and hoses used to convey hydraulic fluids; hydraulically operated components have been known to be unreliable and there is substantial weight associated with hydraulic accumulators for subsea applications and the time taken to run hydraulic lines for mobile land rig operations.

The function of the annular BOP is critical to safe well construction and/or well intervention and therefore such devices cannot be removed from service during well construction and intervention operations due to associated drawbacks. There is a need for actuation devices and methods to operate a seal element in annular BOPs which does not rely on hydraulic pressure to directly actuate the seal element.

SUMMARY

A rotary drive actuator for an annular well pressure control device according to one aspect includes a piston having a tapered inner surface, a through bore and a threaded outer surface. A threaded sleeve having a threaded inner surface is in threaded engagement with the threaded outer surface of the piston. A rotary motor is arranged to rotate the threaded sleeve, whereby rotation of the rotary motor causes corresponding axial motion of the piston.

In some embodiments, an exterior surface of the threaded sleeve comprises a bull gear.

In some embodiments, the rotary motor rotates a pinion gear in functional contact with the bull gear.

In some embodiments, the rotary motor comprises an electric motor.

In some embodiments, the tapered surface is in functional contact with an annular sealing element such that axial motion of the piston causes corresponding radial motion of the annular sealing element.

In some embodiments, the annular sealing element comprises elastomer.

In some embodiments, the threaded inner surface and the threaded outer surface comprise at least one of a helical gear, a herringbone gear, a worm gear, and a double enveloping worm gear.

In some embodiments, the rotary drive actuator forms part of at least one of a connector and a rotating control device.

An annular wellbore pressure control device according to another aspect includes a high pressure housing defining an interior space and having features at each axial end for connection to a wellbore and/or to an element of a wellbore pressure control device. A piston having a tapered inner surface, a through bore and a threaded outer surface is disposed in the interior space and arranged to move axially within the interior space. A threaded sleeve having a threaded inner surface is in threaded engagement with the threaded outer surface of the piston, the threaded sleeve rotatably supported in the interior space. A rotary motor is arranged to rotate the threaded sleeve, whereby rotation of the rotary motor causes corresponding axial motion of the piston. An annular sealing element is disposed in the tapered inner surface of the piston such that axial motion of the piston causes corresponding radial motion of the annular sealing element.

In some embodiments, an exterior surface of the threaded sleeve comprises a bull gear.

In some embodiments, the rotary motor rotates a pinion gear in functional contact with the bull gear.

Some embodiments further comprise a pressure resistant housing enclosing the pinion gear. The pressure resistant housing is coupled to the high pressure housing.

In some embodiments, the rotary motor comprises an electric motor.

In some embodiments, the tapered surface is in functional contact with an annular sealing element such that axial motion of the piston causes corresponding radial motion of the annular sealing element.

In some embodiments, the annular sealing element comprises elastomer.

Some embodiments further comprise at least one additional rotary motor arranged to rotate the threaded sleeve.

The annular wellbore pressure control device of claim 16 wherein the at least one additional rotary motor rotates an additional pinion gear in functional contact with the bull gear.

Some embodiments further comprise an additional pressure resistant housing enclosing the additional pinion gear, the additional pressure resistant housing coupled to the high pressure housing.

In some embodiments, the at least one additional rotary motor comprises an electric motor.

DETAILED DESCRIPTION

Figure 1:
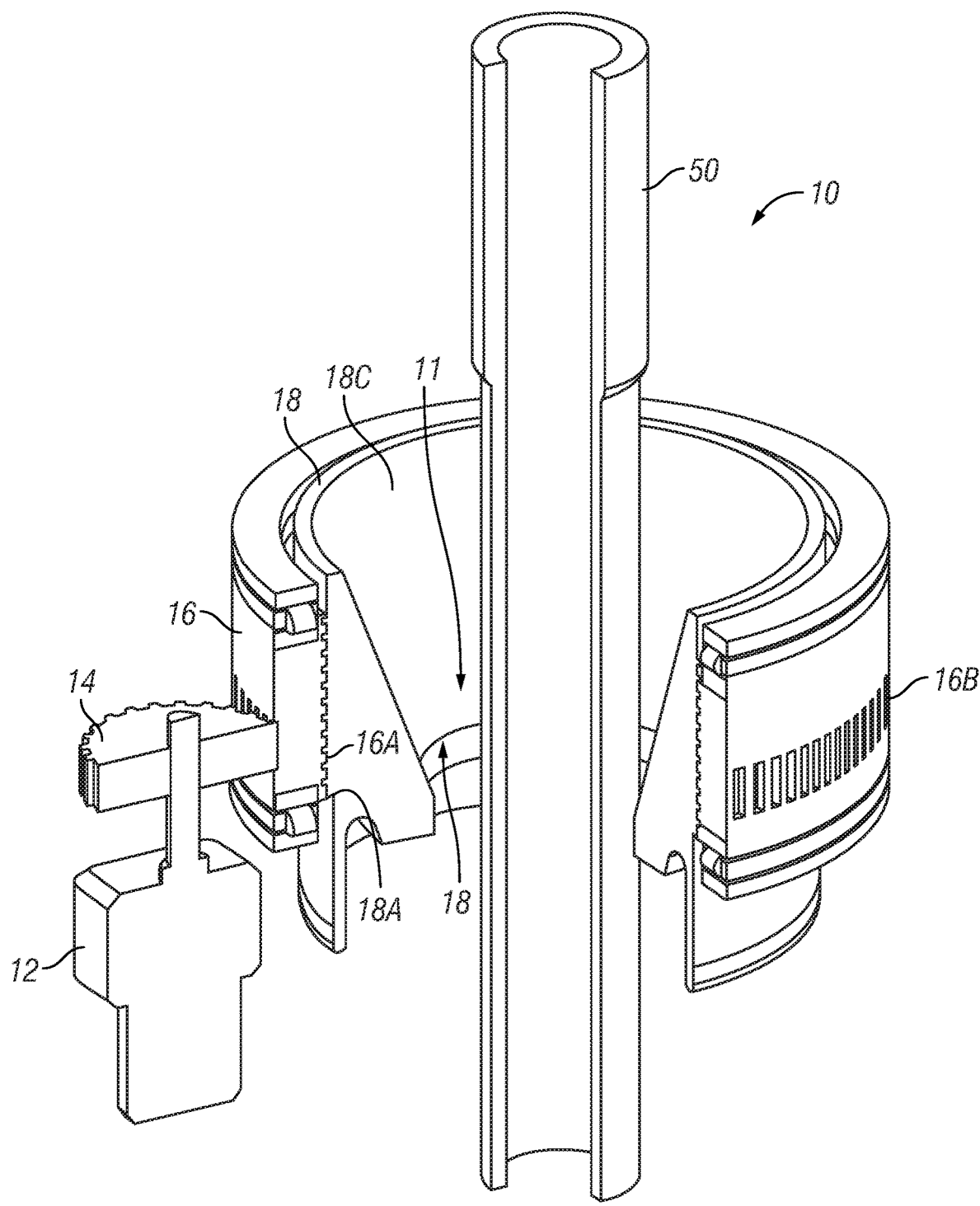
FIG. 1 shows functional components of an example embodiment of an annular wellbore pressure control device according to the present disclosure.

FIG. 1 shows functional components of an example embodiment of a rotary drive actuator 10 for an annular pressure control device (e.g., an annular BOP) according to the present disclosure. The functional components of the rotary drive 10 may be fundamentally comprised of a central bore 11 containing an annular sealing element (see 20 in FIG. 2), which may be an elastomer sealing element, and an annular piston 18 that moves axially, i.e., parallel to or along an axis of an annular element housing (24, 26 in FIG. 2) to deform the annular sealing element (20 in FIG. 2) radially and thus to close against a pipe or conduit 50, such as a drill pipe, disposed through the annular BOP. Axial movement of the piston 18 may compress the annular sealing element (20 in FIG. 2) radially by having a tapered inner surface 18C in the piston 18 such that axial motion of the piston 18 causes the annular seal element (20 in FIG. 2) to be disposed in a portion of the piston 18 having progressively reduced internal diameter. The piston 18 may comprise an opening 18D along the longitudinal dimension of the piston 18 to enable passage therethrough of objects such as the conduit 50.

In some embodiments, the rotary drive actuator 10 forms part of a connector or a rotating control device (RCD). In embodiments wherein a connector is used, axial movement of the rotary drive actuator 10 could be used to actuate a set of dogs for mating with a wellhead or mandrel. One example embodiment of such device is made by Dril-Quip, Inc., 6401 N. Eldridge Parkway, Houston, Tex. 77041 as part of a hydraulic wellhead connection system.

The outer surface of the piston 18 may be substantially cylindrically shaped and comprises a threaded section 18A. The threaded section 18A is operatively engaged with internal threads 16A on a threaded sleeve 16 in a leadscrew type arrangement. The outer diameter of the threaded sleeve 16 may comprise a bull gear 16B. The bull gear 16B, and thus the threaded sleeve 16, may be in turn driven by a pinion gear 14 rotated by a rotary motor 12, such as an electric motor. The pinion gear 14 in the present example embodiment may comprise a spur gear. While what is described above is one possible embodiment, other example embodiments may comprise a roller screw or ball screw instead of a leadscrew for obtaining linear motion of the piston 18 when the threaded sleeve 16 is rotated. Other example embodiments may comprise a helical gear, a herringbone gear, a worm gear, and a double enveloping worm gear, for example, instead of a spur gear. In other embodiments, a separate reducing gear box (not shown) may be coupled at its input to the output of the motor 12 and at its output to the pinion gear 14. In some embodiments, a plurality of motors and associated pinion and/or other gears may be used to drive the bull gear 16B, as will be further explained with reference to FIG. 3.

Figure 2:
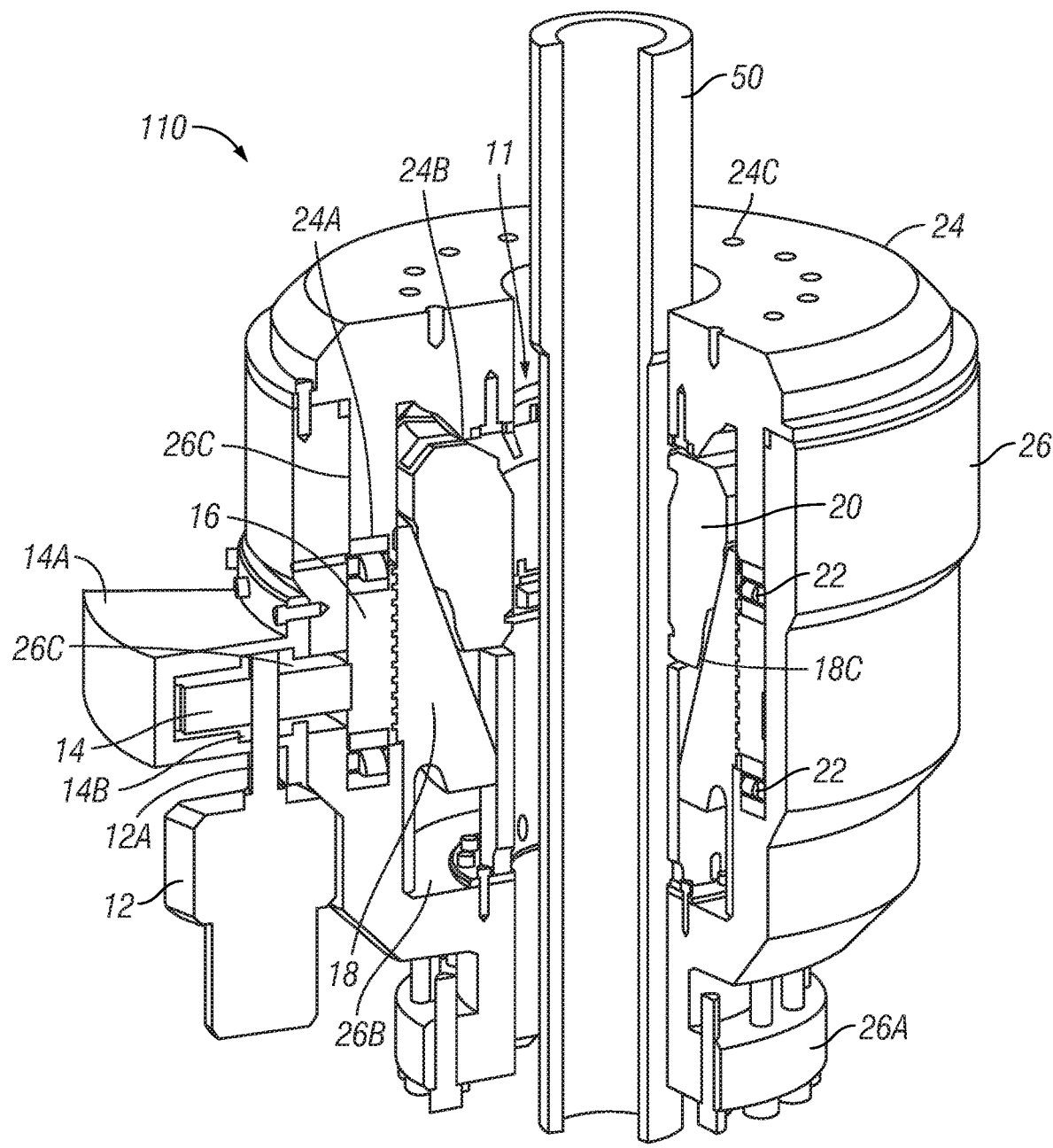
FIG. 2 shows a cutaway view of an example embodiment of an annular pressure control device according to the present disclosure.

FIG. 2 shows a cut away view of an example embodiment of an annular BOP 110 according to the present disclosure. A lower high pressure housing 26 may define an interior space 26B in which may be disposed the piston 18, the threaded sleeve 16, bearings 22 to rotatably support the threaded sleeve 16 and a lower connection 26A, for example a flange, to connect the lower high pressure housing 26 to other components of a wellbore pressure control apparatus, not shown in the figures (or to a component of the wellbore itself such as a surface casing or a riser). The annular sealing element 20 is shown disposed in the tapered inner surface 18C of the piston 18. The conduit 50, e.g., a drill pipe, is shown passing through the lower high pressure housing 16, the piston 18 and the annular sealing element 20, all of which are disposed in the bore 11.

An upper high pressure housing 24 may be removably, sealingly coupled to an upper end 26C of the lower high pressure housing 26. The upper high pressure housing 24 may comprise a bearing surface 24A that contacts an upper one of the bearings 22 such that the threaded sleeve 16 is rotatably supported within the lower high pressure housing 26. The upper high pressure housing 24 may comprise a contact surface 24B which restrains the annular sealing element 20 from moving axially as the piston 18 is moved axially upwardly. Thus, linear upward axial motion of the piston 18 urges the annular sealing element 20 against the contact surface 24B in the upper high pressure housing 24, thus causing the annular sealing element 20 to compress radially inwardly, ultimately against the conduit 50 to seal the bore 11. The upper high pressure housing 24 may comprise a connection feature 24C to enable coupling the upper high pressure housing 24 to other components of a wellbore pressure control system (e.g., to pipe rams, blind rams or shear rams) or to other wellbore components such as a riser.

In the present example embodiment, the pinion gear 14 may be disposed in a pressure-sealed pinion gear housing 14A. The pinion gear housing 14A may be attached to a corresponding opening 26C in the exterior of the lower high pressure housing 26. The pinion gear housing 14A may comprise a shaft seal 14B to enable sealed through-passage of the motor shaft 12A. In some embodiments, the motor 12 may be disposed inside the pinion hear housing 14A.

Figure 3:
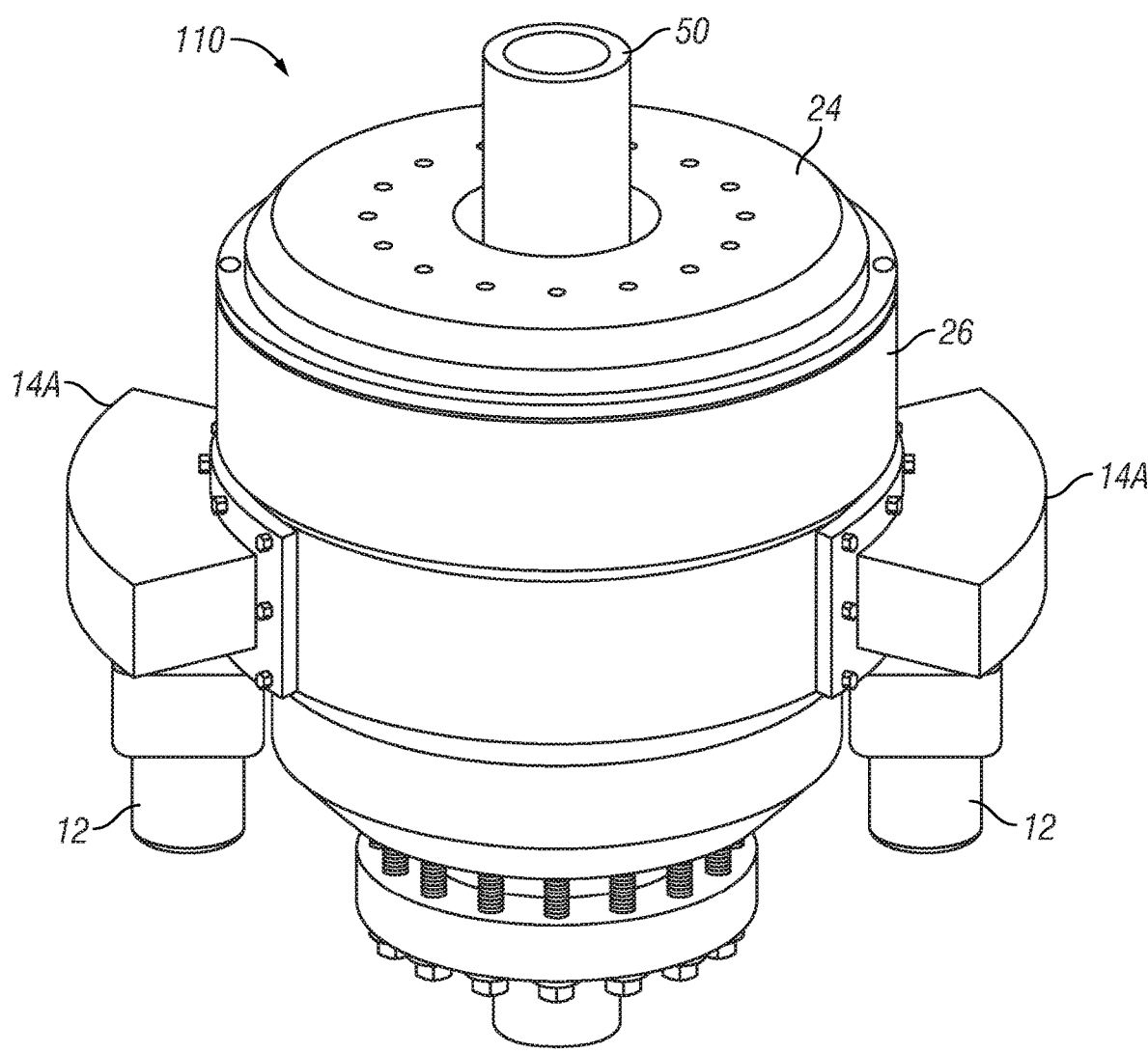
FIG. 3 shows another example embodiment of an annular pressure control device having more than one rotary motor.

FIG. 3 shows another example embodiment of an annular BOP 110 having more than one motor 12, pinion gear (14 in FIG. 2) and pinion hear housing 14A. Such embodiments may be desirable to provide additional torque to rotate the threaded sleeve (16 in FIG. 2), or to enable using smaller size and weight motors 12.

An annular wellbore pressure control device according to the present disclosure may provide one or more of the following benefits. Size and weight of the annular wellbore pressure control device may be reduced. The need to extend hydraulic or pneumatic pressure lines from the annular pressure control device to the surface, in particular in deep water wellbore operations may be avoided.

While this description has focused on the application of rotary motors for use in actuating an annular BOP, it is to be clearly understood that a substantially similar rotary drive configuration could also be used in a connector and in a rotating control device.

Although only a few examples have been described in detail above, those skilled in the art will readily appreciate that many modifications are possible in the examples. Accordingly, all such modifications are intended to be included within the scope of this disclosure as defined in the following claims.

What is claimed is:

1. An annular wellbore pressure control device, comprising:
   a high pressure housing defining an interior space and having features at each axial end for connection to a wellbore and/or to an element of a wellbore pressure control device;

a piston having a tapered inner surface, a through bore and a threaded outer surface disposed in the interior space and arranged to move axially within the interior space;

a threaded sleeve having a threaded inner surface in threaded engagement with the threaded outer surface of the piston, and an exterior surface comprising a bull gear;

the threaded sleeve rotatably supported in the interior space;

a rotary motor arranged to rotate a pinion gear in functional contact with the bull gear of the threaded sleeve to rotate the threaded sleeve, whereby rotation of the threaded sleeve causes corresponding axial motion of the piston;

an annular sealing element disposed in the tapered inner surface of the piston such that axial motion of the piston causes corresponding radial motion of the annular sealing element; and a pressure resistant housing enclosing the pinion gear, the pressure resistant housing coupled to the high pressure housing.

2. The annular wellbore pressure control device of claim 1 wherein the rotary motor comprises an electric motor.

3. The annular wellbore pressure control device of claim 1 wherein the annular sealing element comprises an elastomer.

4. The annular wellbore pressure control device of claim 1 further comprising at least one additional rotary motor arranged to rotate the threaded sleeve.

5. The annular wellbore pressure control device of claim 4 wherein the at least one additional rotary motor rotates an additional pinion gear in functional contact with the bull gear.

6. The annular wellbore pressure control device of claim 5 further comprising an additional pressure resistant housing enclosing the additional pinion gear, the additional pressure resistant housing coupled to the high pressure housing.

7. The annular pressure control device of claim 4 wherein the at least one additional rotary motor comprises an electric motor.

* * * * *